(12) United States Patent
Takemoto

(10) Patent No.: US 11,572,212 B2
(45) Date of Patent: Feb. 7, 2023

(54) PACKING MACHINE

(71) Applicant: SHIBUYA PACKAGING SYSTEM CORPORATION, Kanazawa (JP)

(72) Inventor: Tomohiro Takemoto, Kanazawa (JP)

(73) Assignee: SHIBUYA PACKAGING SYSTEM CORPORATION, Kanazawa (JP)

( * ) Notice: Subject to any disclaimer, the term of this patent is extended or adjusted under 35 U.S.C. 154(b) by 0 days.

(21) Appl. No.: 17/233,550

(22) Filed: Apr. 19, 2021

(65) Prior Publication Data

US 2021/0323709 A1   Oct. 21, 2021

(30) Foreign Application Priority Data

Apr. 20, 2020 (JP) .............................. JP2020-074969

(51) Int. Cl.
*B65B 57/02* (2006.01)
*B65B 9/20* (2012.01)
*B65B 51/30* (2006.01)

(52) U.S. Cl.
CPC ................ *B65B 57/02* (2013.01); *B65B 9/20* (2013.01); *B65B 51/30* (2013.01)

(58) Field of Classification Search
CPC ........... B65B 57/02; B65B 9/20; B65B 51/30; B31B 70/18; B31B 70/64; B31B 2150/00
USPC .................................... 53/545, 451; 493/254
See application file for complete search history.

(56) References Cited

U.S. PATENT DOCUMENTS

| | | | | |
|---|---|---|---|---|
| 4,532,754 A | * | 8/1985 | Hokanson | B65B 9/22 53/139.2 |
| 4,589,247 A | * | 5/1986 | Tsuruta | B65B 9/213 53/550 |
| 4,829,745 A | * | 5/1989 | Behr | B65B 9/2035 53/551 |
| 4,986,054 A | * | 1/1991 | McMahon | B65B 9/213 53/552 |
| 5,046,300 A | * | 9/1991 | Custer | B29C 66/4312 53/139.2 |
| 5,048,270 A | * | 9/1991 | McMahon | B65B 9/2042 493/255 |
| 5,137,505 A | * | 8/1992 | Ishii | B31B 70/00 493/476 |
| 5,778,642 A | * | 7/1998 | Fuss | B65B 55/20 53/551 |

(Continued)

FOREIGN PATENT DOCUMENTS

| | | |
|---|---|---|
| DE | 10 2007 022 854 | 11/2008 |
| GB | 2098338 | 11/1982 |
| JP | 08-025543 B2 | 10/1993 |

OTHER PUBLICATIONS

Extended European Search Report for corresponding EP Application No. 21169111.8-1014, dated Sep. 17, 2021.

*Primary Examiner* — Sameh Tawfik

(74) *Attorney, Agent, or Firm* — Mori & Ward, LLP

(57) ABSTRACT

A packing machine includes a guide configured to guide a sheet of packaging material formed in a tubular shape, a sealing device configured to fuse an overlapping portion of the packaging material, a detection element pivotally attached to the guide and arranged downstream of the sealing device along a welded portion of the packaging material, a biasing member configured to bias the detection element outwardly from the guide, and a detector configured to detect the detection element that is pushed out from the welded portion.

4 Claims, 5 Drawing Sheets

(56) References Cited

U.S. PATENT DOCUMENTS

| | | | | |
|---|---|---|---|---|
| 6,526,733 | B1* | 3/2003 | Schellenberg | B65B 41/18 |
| | | | | 53/64 |
| 7,299,608 | B2* | 11/2007 | Kohl | B65B 9/213 |
| | | | | 53/551 |
| 7,396,323 | B2* | 7/2008 | Giro Amigo | B65B 7/08 |
| | | | | 493/263 |
| 8,132,395 | B2* | 3/2012 | Gehring | B65B 9/20 |
| | | | | 493/429 |
| 10,717,590 | B2* | 7/2020 | Giro Amigo | B29C 66/8122 |

* cited by examiner

FIG. 2A
FIG. 2B
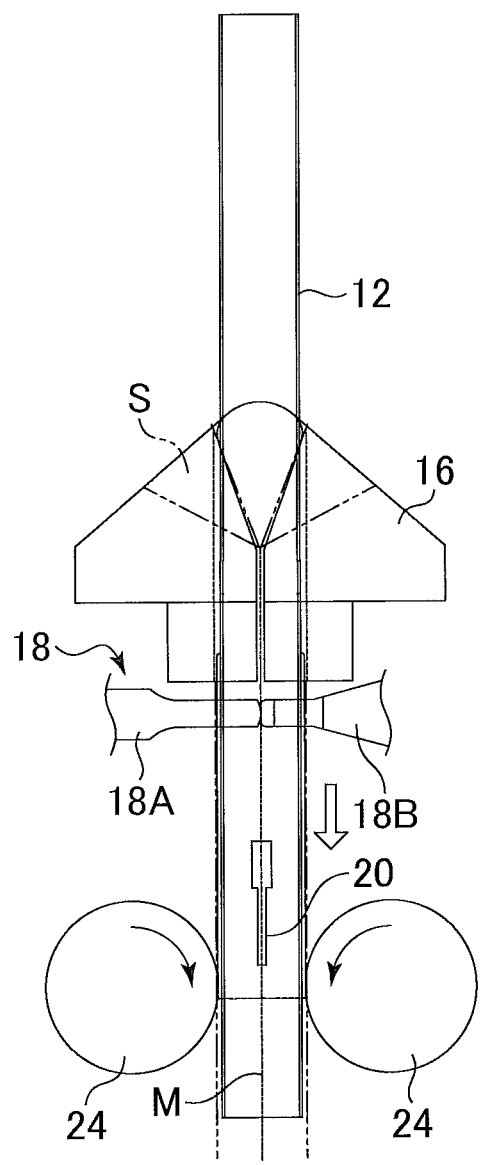
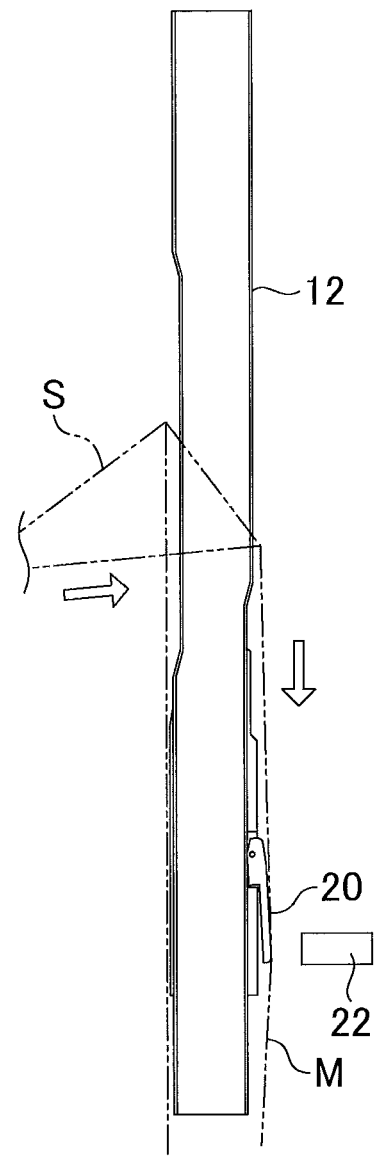

FIG. 3A
FIG. 3B
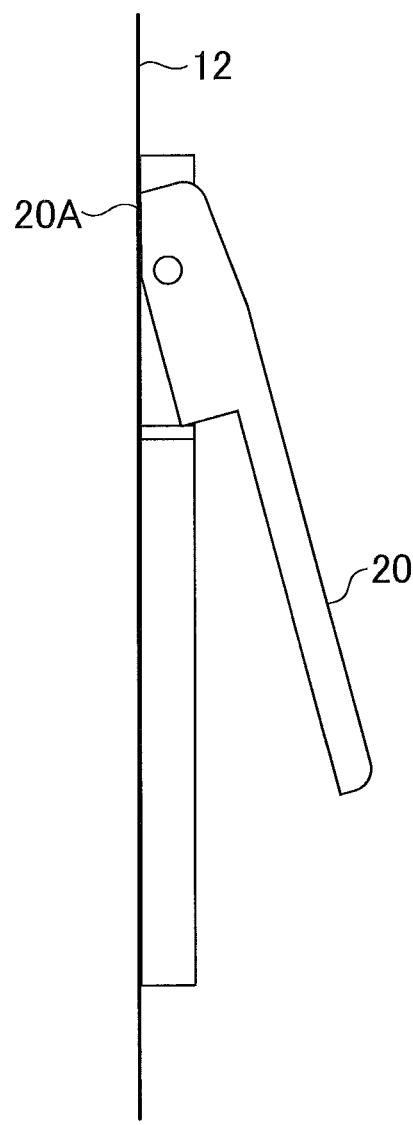
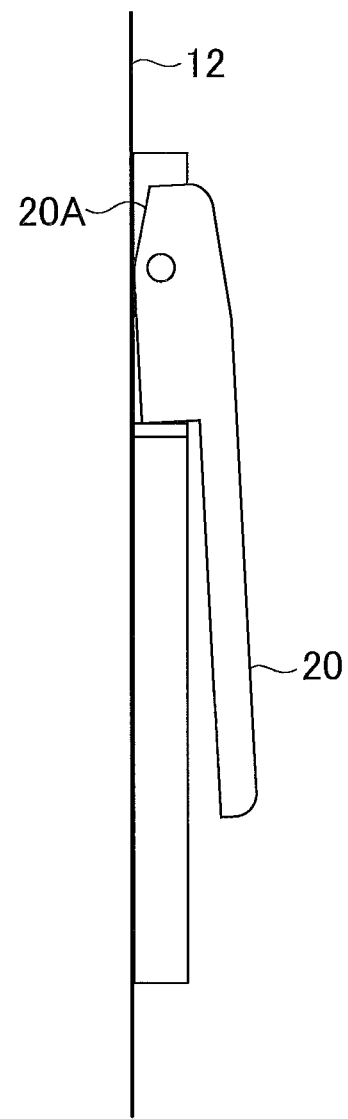

PACKING MACHINE

CROSS-REFERENCE TO RELATED APPLICATIONS

The present application claims priority under 35 U.S.C. § 119 to Japanese Patent Application No. 2020-074969, filed Apr. 20, 2020. The contents of this application are incorporated herein by reference in their entirety.

BACKGROUND OF THE INVENTION

1. Field of the Invention

The present invention relates to a packing machine.

2. Description of the Related Art

A packing machine is known in which a strip of film that is continuously supplied is formed into a tubular shape, and an overlapping portion is welded to form a fusion line. In this machine, cross-sectional tension is applied to the film by an expansion ring having a diameter larger than the diameter of the tubular film arranged inside the welded tubular film immediately after welding to adjust the weld conditions at the overlapping portion. See Japanese Published Examined Patent Application No. H08-025543 or Japanese Patent No. 2119061.

SUMMARY OF THE INVENTION

According to one aspect of the present invention, a packing machine includes a guide configured to guide a sheet of packaging material formed in a tubular shape, a sealing device configured to fuse an overlapping portion of the packaging material, a detection element pivotally attached to the guide and arranged downstream of the sealing device along a welded portion of the packaging material, a biasing member configured to bias the detection element outwardly from the guide, and a detector configured to detect the detection element that is pushed out from the welded portion.

BRIEF DESCRIPTION OF THE DRAWINGS

The objects and advantages of the present invention may be better understood from the following description with references to the accompanying drawings in which:

FIG. 2A is a front view around a guide portion in which the packaging material is wrapped around in a tubular shape;

FIG. 2B is a side view around the guide portion in which the packaging material is wrapped around in a tubular shape;

FIG. 3A is an enlarged side view showing a detection dog;

FIG. 3B is an enlarged side view showing the detection dog;

DESCRIPTION OF THE PREFERRED EMBODIMENTS

Figure 1:
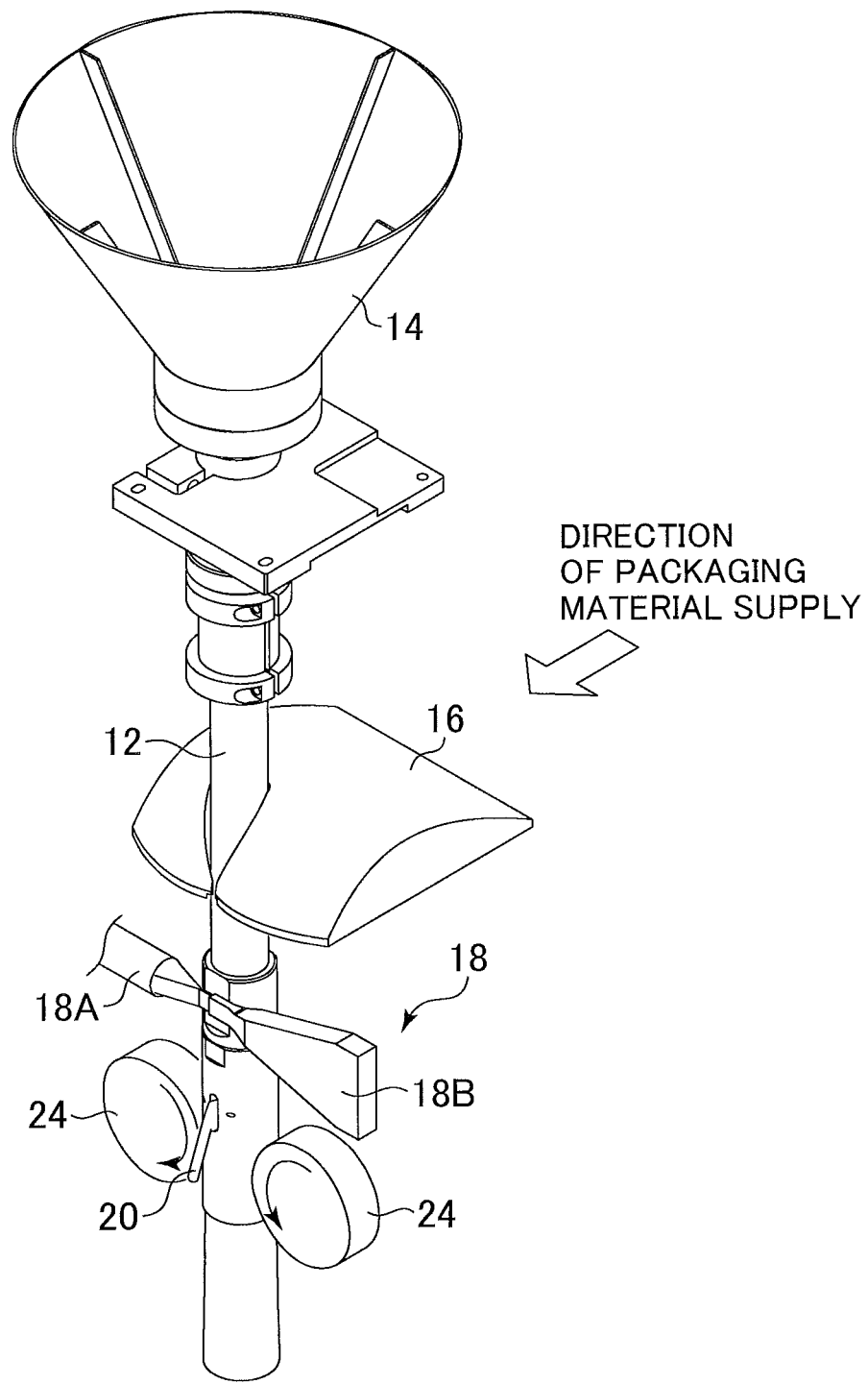
FIG. 1 is a perspective view of a packing machine of a first embodiment of the present invention.

The embodiments of the present invention are described below with references to examples shown in the drawings.

FIG. 1 is a perspective view of a packing machine, which is an embodiment of the present invention. FIG. 2A is a front view around a guide portion in which the packaging material is wrapped around in a tubular shape, and FIG. 2B is a side view thereof.

In the packing machine 10 of the present embodiment, the packaging material S, which is a strip of a continuously supplied sheet of non-woven fabric, is wrapped around a cylindrical guide member (a guide) 12 and an overlapping portion in the vertical direction is fused (vertically sealed) to form a tubular package. The tubular package is then fused in the lateral direction and filled with contents to provide a tetrahedral-shaped extraction bag. Here, fusing means cutting the fabric while it is being welded. Such a machine is conventionally known, as disclosed in Japanese Patent No. 5240482 and the like. In the present embodiment, the guide member 12 also functions as a filling nozzle for supplying the contents to be filled in the package. For example, a hopper 14 that supplies the contents into the guide member 12 is provided at the upper end of the vertically arranged guide member 12.

A conventional forming guide 16 is provided around the circumference of an upper portion of the guide member 12. The forming guide 16 bends the packaging material S, which is supplied as a strip sheet from the side, and wraps it around the circumference of the guide member 12. The packaging material S supplied from the side is bent downward by the forming guide 16 and wrapped around the cylindrical guide member 12 to be formed into a tubular shape. At this time, both sides of the strip of packaging material S are overlapped with a predetermined width along the longitudinal direction of the guide member 12 so that the inner surfaces of the sheet edges are brought into close contact with each other (overlapping portion). The packaging material S is then fed downward along the guide member 12 while maintaining the same conditions.

A sealing device (sealing means) 18 is arranged adjacent to the guide member 12 at a position corresponding to the overlapping portion of the packaging material S, below (downstream side) the forming guide 16. The sealing device 18 is, for example, a device for fusing the overlapping portion and includes an ultrasonic horn 18A and an anvil 18B facing the ultrasonic horn 18A. The ultrasonic horn 18A and the anvil 18B are so arranged to nip the overlapping portion of the packaging material S traveling along the guide member 12. The overlapping portion of the packaging material S is fused by passing between the ultrasonic horn 18A and the anvil 18B so that a weld (fusion line) M is provided in the packaging material.

Furthermore, the guide member 12 of the present embodiment is provided with a detection dog (detection element) 20 at a position corresponding to the welded portion M of the packaging material S below (downstream side) the sealing device 18. FIG. 3A and FIG. 3B are enlarged side views showing the detection dog 20 in different states.

The detection dog 20 is arranged along the longitudinal direction of the guide member 12 in order to be arranged along the welded portion M. An upper end (upstream end) of the detection dog 20 is attached to the side surface of the guide member 12 so as to pivot about the horizontal axis. A lower end (downstream end) of the detection dog 20 is urged by a biasing member (not shown) so as to extend outward. FIG. 3A illustrates a state when the detection dog 20 is pushed outward by the biasing force. FIG. 3B illustrates when the detection dog 20 is pressed against the guide member 12 resisting the biasing force. Configured at the upper end of the detection dog 20 is an abutting portion 20A that engages with the guide member 12 to restrict the pivot angle when the detection dog 20 is extended toward the welded portion M, see the state in FIG. 3A.

Figure 4:
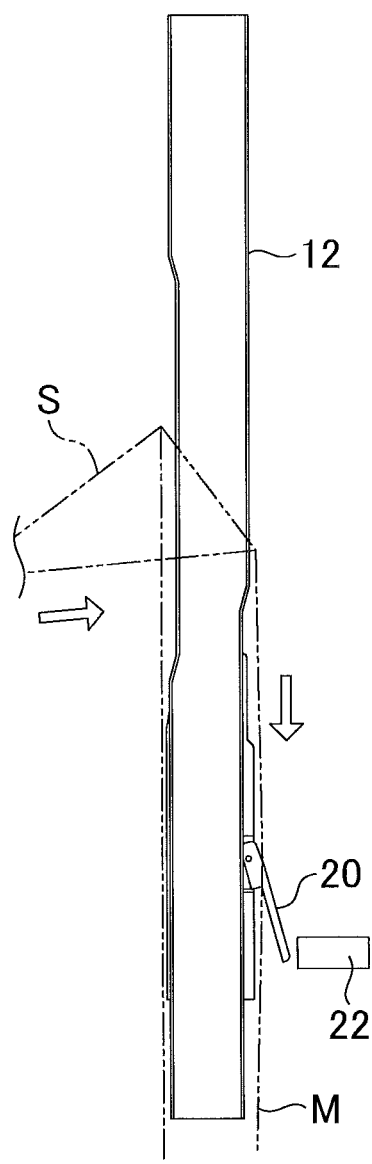
FIG. 4 is a side view around the guide member when the detection dog is extended.

FIG. 4 is a side view of the guide member, illustrating a state when the detection dog 20 protrudes from the welded portion M of the packaging material S, which is formed into a tubular shape. At substantially the same height as the lower end of the detection dog 20, a proximity sensor (detector) 22 is arranged at a predetermined distance from the guide member 12 and faces the detection dog 20. The proximity sensor 22 detects the proximity of the detection dog 20 to determine whether or not the lower end portion of the detection dog 20 has been pushed out from the welded portion M (detection means). Signals from the proximity sensor 22 are sent to a control unit (not shown).

Furthermore, at substantially the same height as the lower end of the detection dog 20, a pair of feed rollers 24 are arranged for feeding the tubular packaging material S downward along the guide member 12. As shown in the front view of FIG. 2A, the pair of feed rollers 24, which are arranged to sandwich the guide member 12 from both sides, are rotated about the horizontal axis in opposite directions at the same speed. The tubular packaging material S surrounding the guide member 12 is held between the guide member 12 and the feed roller 24 on both sides of the guide member 12, and is synchronously fed downward by the feed rollers 24.

Furthermore, on the downstream side of the lower end of the guide member 12, a horizontal sealing device is provided to nip the tubular packaging material S in a direction crossing the longitudinal axis of the tubular sheet and to fuse (horizontally seal) the packaging material S. The contents of the package are then supplied through the guide member 12. Afterward, the tubular package is again laterally sealed at the position above where the contents accumulated on the previously sealed portion so that a tetrahedral-shaped extraction bag is produced containing the contents inside. In this embodiment, the contents are, for example, green tea or black tea.

When the overlapping portion (overlapping allowance) is properly welded by the sealing device 18, the detection dog 20 is kept inside the tubular packaging material S against the biasing force. As a result, the detection dog 20 is arranged substantially along the longitudinal direction of the guide member 12. However, when the overlapping portion is not properly welded, the lower end portion of the detection dog 20 is pushed outward by the biasing force through an interstice between both side edges (overlapping portions) of the packaging material S. Thereby, the lower end of the detection dog 20 is detected by the proximity sensor 22 and the control unit determines that a seal defect has occurred in the welded portion M (determinor).

As described above, according to the present embodiment, it is possible to detect a defective seal in the welded portion of the sheet of packaging material, which is continuously supplied and formed into a tubular shape, without applying a large load to the packaging material.

Next, an alternate example of the present embodiment will be described with reference to FIG. 5, which is a side view around the guide member. In the alternate example, the shape of the detection dog is different from that of the previous embodiment, but the other configurations are the same as those illustrated in the previous embodiment. Therefore, the same reference numerals are used and the descriptions thereof will be omitted.

Figure 5:
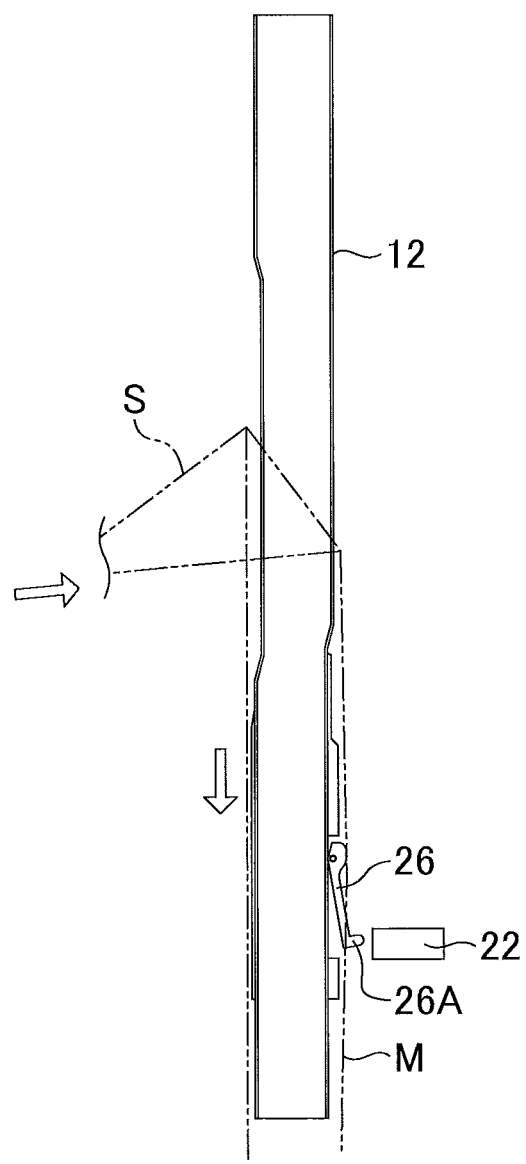
FIG. 5 is a side view around the guide member when a detection dog of an alternative example is applied.

As shown in FIG. 5, a detection dog 26 of the alternate example includes a protrusion 26A at the lower end that projects convexly toward the welded portion M. The tip of the protrusion 26A is formed, for example, in an arc shape so that friction with the inner peripheral surface of the tubular packaging material S is reduced. The protrusion 26A can protrude from the packaging material S even when the welded portion M has a small hole, which can be detected by the proximity sensor 22. Accordingly, a seal defect can be more precisely detected.

Although in the present embodiments a machine has been described that manufactures a tetrahedral-shaped extraction bag containing contents, such as tea leaves or black tea, by applying a non-woven fabric as a packaging material, the present invention is not limited to the foregoing embodiments. It may also be applied to cases in which a resin sheet is used to seal liquid contents or be applied to a three-sided seal or a four-sided sealed package containing any contents.

Although the embodiments of the present invention have been described herein with references to the accompanying drawings, obviously many modifications and changes may be made by those skilled in this art without departing from the scope of the invention.

The present disclosure relates to subject matter contained in Japanese Patent Application No. 2020-074969 (filed on Apr. 20, 2020), which is expressly incorporated herein, by reference, in its entirety.

The invention claimed is:

1. A packing machine comprising:
    a guide having an outer surface and one end and configured to guide a sheet of packaging material to be formed in a tubular shape such that an inner surface of the tubular shape slides on the outer surface of the guide toward the one end in a sliding direction;
    a sealing device to fuse an overlapping portion of the packaging material to seal the overlapping portion forming an welded portion on the tubular shape along the sliding direction;
    a detection element provided on the outer surface of the guide between the sealing device and the one end of the guide along the sliding direction, wherein the detection element is covered by the sheet having the tubular shape and the inner surface of the tubular shape slides on the detection element, the detection element having a rotation axis and a tip which is positioned between the rotation axis and the one end of the guide, the detection element being rotatable along a plane including the sliding direction around the rotation axis and being pressed to rotate around the rotation axis such that the tip is away from the outer surface of the guide; and
    a detector to detect the detection element that is pushed out from the welded portion.

2. The packing machine according to claim 1, further comprising:
    a determinor configured to determine a seal defect in the welded portion when the detection element is pushed out from the welded portion.

3. The packing machine according to claim 1, wherein the detector comprises a proximity sensor that is configured to detect a proximity of the tip of the detection element.

4. The packing machine according to claim 3, wherein the tip of the detection element is configured to protrude convexly protruding toward the welded portion.

* * * * *